US012596591B1

(12) United States Patent
Alt et al.

(10) Patent No.: US 12,596,591 B1
(45) Date of Patent: Apr. 7, 2026

(54) PERFORMANCE BENCHMARKING AND CHARACTERIZATION FOR CLOUD AND BARE METAL SYSTEMS

(71) Applicant: Advanced Micro Devices, Inc., Santa Clara, CA (US)

(72) Inventors: Max Alt, San Francisco, CA (US); Paulo Roberto Pereira De Souza filho, Maringa (BR)

(73) Assignee: Advanced Micro Devices, Inc., Santa Clara, CA (US)

( * ) Notice: Subject to any disclaimer, the term of this patent is extended or adjusted under 35 U.S.C. 154(b) by 734 days.

(21) Appl. No.: 17/495,221

(22) Filed: Oct. 6, 2021

Related U.S. Application Data

(60) Provisional application No. 63/088,437, filed on Oct. 6, 2020.

(51) Int. Cl.
| | |
|---|---|
| *G06F 9/50* | (2006.01) |
| *G06F 11/34* | (2006.01) |
| *G06F 18/21* | (2023.01) |
| *G06F 18/214* | (2023.01) |
| *G06N 20/00* | (2019.01) |

(52) U.S. Cl.
CPC ........ *G06F 9/5077* (2013.01); *G06F 11/3457* (2013.01); *G06F 18/2148* (2023.01); *G06F 18/217* (2023.01); *G06N 20/00* (2019.01)

(58) Field of Classification Search
CPC .... G06F 18/02; G06F 9/5077; G06F 11/3457; G06F 18/2148; G06F 18/217; G06N 20/00
USPC ...................................................... 718/104
See application file for complete search history.

(56) References Cited

U.S. PATENT DOCUMENTS

| | | | |
|---|---|---|---|
| 8,286,177 | B2 | 10/2012 | Hollingsworth |
| 8,296,419 | B1 | 10/2012 | Khanna et al. |
| 10,817,401 | B1 | 10/2020 | Lewis |
| 2002/0129127 | A1* | 9/2002 | Romero .............. H04L 67/1014 709/220 |
| 2011/0153529 | A1* | 6/2011 | Bracy ..................... G06F 30/33 706/54 |
| 2012/0226788 | A1 | 9/2012 | Jackson |
| 2012/0290521 | A1* | 11/2012 | Frank .................... G06N 20/00 706/45 |

(Continued)

OTHER PUBLICATIONS

Co-pending U.S. Appl. No. 17/393,730, filed Aug. 4, 2021.
International Search Report and Written Opinion for International Patent Application No. PCT/US21/42439.

*Primary Examiner* — Pierre Vital
*Assistant Examiner* — Jordan Scott Motter
(74) *Attorney, Agent, or Firm* — Fishman Stewart PLLC

(57) ABSTRACT

A system and method for benchmarking the performance of computing resources in a distributed computing system is disclosed. The system may comprise a performance database, a training program, and a machine learning engine. The training program may be configured to create a training data set by running a plurality of workloads multiple times on a plurality of different cloud computing systems using a plurality of different configurations. The training data may be stored in the performance database, and the machine learning engine may be configured to use the training data to create a model usable to predict the performance of future jobs on different cloud computing systems and bare metal systems.

20 Claims, 4 Drawing Sheets

(56)     References Cited

U.S. PATENT DOCUMENTS

| | | | |
|---|---|---|---|
| 2014/0089917 A1 | 3/2014 | Attalla et al. | |
| 2016/0019636 A1 | 1/2016 | Adapalli et al. | |
| 2016/0098334 A1 | 4/2016 | Hariharakrishnan et al. | |
| 2016/0224898 A1 | 8/2016 | Ryckbosch et al. | |
| 2017/0249192 A1 | 8/2017 | Thompson | |
| 2017/0255629 A1* | 9/2017 | Thom | G06N 10/00 |
| 2017/0308960 A1* | 10/2017 | Mascaro | G06Q 40/123 |
| 2017/0373940 A1 | 12/2017 | Shahab et al. | |
| 2018/0167268 A1* | 6/2018 | Liguori | H04L 67/10 |
| 2018/0189332 A1* | 7/2018 | Asher | G06F 16/215 |
| 2018/0293697 A1* | 10/2018 | Ray | G06F 9/3888 |
| 2018/0348715 A1* | 12/2018 | Bandaru | G05B 13/0265 |
| 2018/0365576 A1 | 12/2018 | Guttmann et al. | |
| 2019/0171483 A1 | 6/2019 | Santhar et al. | |
| 2019/0208009 A1 | 7/2019 | Prabhakaran et al. | |
| 2020/0034270 A1* | 1/2020 | Desai | H04L 41/40 |
| 2020/0167887 A1* | 5/2020 | Wang | G06V 10/82 |
| 2020/0264841 A1* | 8/2020 | Tsunoda | G06N 5/04 |
| 2021/0096913 A1* | 4/2021 | Nadeau | G06N 5/04 |
| 2021/0319354 A1* | 10/2021 | Raz | G06F 11/3409 |
| 2021/0390495 A1* | 12/2021 | Upadhyay | G06F 9/5016 |
| 2022/0283784 A1* | 9/2022 | Degen | G06F 8/20 |

* cited by examiner

PERFORMANCE BENCHMARKING AND CHARACTERIZATION FOR CLOUD AND BARE METAL SYSTEMS

CROSS-REFERENCE TO RELATED APPLICATIONS

This application claims the benefit of, and priority to, U.S. Provisional Application Ser. No. 63/088,437, filed Oct. 6, 2020, the disclosure of which is hereby incorporated herein by reference in its entirety and for all purposes.

TECHNICAL FIELD

The present disclosure generally relates to the field of computing and, more particularly, to systems and methods for comparing the performance of different computing systems.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Data intensive computing tasks such as machine learning (ML), artificial intelligence (AI), data mining, and scientific simulation (often called applications, jobs, or workloads) frequently require large amounts of computing resources, including storage, memory, and computing power. As the time required for a single system or processor to complete many of these tasks would be too great, they are typically divided into many smaller tasks that are distributed to large numbers of computing devices or processors such as central processing units (CPUs) or graphics processing units (GPUs) within one or more computing system or devices (called nodes) that work in parallel to complete the tasks more quickly. Specialized computing systems (often called clusters) have been built that offer large numbers of nodes that work in parallel and that have been designed to complete these tasks more quickly and efficiently. Clusters can have different topologies (i.e., how compute resources are interconnected within a node or over multiple nodes). Groups of these specialized computing systems can be used together (both locally and remotely) to create large and complex distributed systems able to handle highly complex computational workloads. As clusters are expensive to acquire and operate, many users prefer to use clusters via a cloud computing service. In a cloud computing service, a cloud service provider operates the clusters and effectively rents out portions of them to customers that upload and execute their workloads remotely.

Most cloud computing services are based on virtualization technology, which enables multiple users running different applications or workloads to share the same physical computing resources while remaining safely isolated from one another. This ability is a useful enabler of cost-effective cloud computing. It allows users to create different instances (often called queues) with different numbers of virtual processors and specific amounts of memory and storage. For example, each instance a user creates can be customized to match the needs of their particular workload.

This ability to customize is helpful, but it does require the user to specify a configuration for each instance they create. Since cloud service providers charge more based on the resources used (e.g., charging more for higher numbers of virtual processors), selecting more than is needed can be very expensive. Conversely, specifying fewer than needed can result in the workload not completing in the desired timeframe. For high performance workloads such as artificial intelligence, scientific simulation, and graphics processing, this can mean the difference between having a task take weeks instead of hours if too few resources are selected or overpaying by hundreds or thousands of dollars if too many resources are selected.

A common workflow for users is to create applications using an on-premises bare metal system (e.g., a workstation or server). Once created, they test the application with small data sets and iteratively make changes and improvements. Once their application is completed, they migrate it to a cloud to run with full datasets on a large virtual system with many more processors than they have access to on their on-premises systems. But a virtual processor rarely performs the same as a bare-metal processor, and without easy access to performance comparisons, these users must guess and risk either overpaying for resources they do not need or missing deadlines as they wait longer than needed for their application to complete.

Traditionally, users have had to rely on their own one-off performance modeling to calculate the number of processors (e.g., virtual processors in cloud systems, and physical processors in bare metal systems) they should use for their workload. This typically involves testing their application on their on-premises bare metal system, and then assuming a certain speed-up factor based on the number of additional CPUs or GPUs that will be used in the cloud system.

However, this does not work well in many cases, as virtual processors in a cloud computing system will rarely perform the same as the processors in the user's on-premises system. Some users may attempt to use cloud provider's published performance benchmarks to estimate performance improvements. However, the generic benchmarks used by the cloud provider may not accurately reflect the user's actual application. Virtualization can also make the performance modeling more difficult due to potential inconsistencies (e.g., impact of other virtual machines running on the system, or different instances being assigned to different physical machines). Also, some cloud computing services (particularly public clouds) do not provide full CPU access (e.g., access to CPU performance counters such as the CPU instructions counter) to customer applications. Without access to CPU performance counters, it can be difficult to measure performance accurately with traditional profiling tools (e.g., the commonly used Linux performance tool called "perf").

Yet another difficulty is that performance may not be the same from one cloud service provider to another. For example, a node with four virtual processors from cloud service provider A may not have the same performance as a node with four virtual processors from cloud service provider B. This can have significant impacts when a user wishes to move from one cloud provider to another. Switching cloud providers may be desirable for a number of reasons, such as taking advantage of cheaper pricing, changes in data locality, etc.

With all these difficulties, many creators of high-performance workloads (e.g., data scientist) are left to guess at which cloud service and configuration is the best for their workload. For at least these reasons, there is a need for improved systems and methods for performance benchmarking across multiple different cloud computing systems.

SUMMARY

Improved systems and methods for comparing performance between different cloud service providers are contemplated. In addition, systems and methods for comparing performance between different cloud service providers and different bare metal systems are also contemplated.

In one embodiment, a method for predicting performance of a job is contemplated. In one embodiment the method comprises creating a training data set by running a plurality of workloads multiple times on a plurality of different cloud computing systems using a plurality of different configurations. A machine learning engine is trained to predict the relative performance of future jobs based on the training data set (e.g., relative to one or more previously executed jobs with performance data that is stored in a performance database), and a performance level is predicted for a future job (e.g., one that has not been run on the computing system) using the machine learning engine. The machine learning engine may use artificial intelligence algorithms (e.g., a K-Nearest Neighbor algorithm) to classify the captured performance data and find the closest existing applications in the database upon which to base performance estimations for the user's job.

In some embodiments, monotonic groups of combinations of cloud computing systems and configurations are identified that have similar performance characteristics to the future jobs by using the machine learning engine. An eigen feature may also be determined for a combination of a particular cloud system and the job, and it may then be used for performance estimations and rankings. An eigen feature is a feature that most significantly impacts performance of an application on a particular computing system-configuration combination. For example, the eigen feature of a particular file-intensive application may be memory bandwidth on a first computing system configured with hard disk storage, whereas on a second computing system configured with fast non-volatile memory, CPU speed may be the feature that most impacts performance.

In some embodiments, job metadata may be collected (e.g., automatically from the application or by querying the user submitting the application), and that job metadata may be used to assist in finding a matching existing application that can be used to predict performance. In some embodiments, confidence levels may be calculated for the predictions, and an alert or a generic performance ranking may be displayed (e.g., ranked based on CPU) in response to the predicted performance level being below a predetermined confidence level.

For new jobs being submitted, in some embodiments one or more test runs may be performed on one or more different computing systems using multiple different system configurations, and performance data for the tests may be captured and used to predict the application's performance. These data from these tests may be used in place of, or in addition to, using the job metadata.

As part of initialization, the system may detect whether there is sufficient data present in the training data set to a achieve a predetermined level of confidence in the predicting, and in response to insufficient data being present, a list of additional workload and cloud computing system combinations for testing may be created to allow the predetermined level of confidence to be achieved.

A system for managing computing jobs is also contemplated. In one embodiment, the system may comprise a performance database, a training program, and a machine learning engine. The training program may be configured to (i) create a training data set by running a plurality of workloads multiple times on a plurality of different cloud computing systems using a plurality of different configurations and (ii) store the training data set in the performance database. The machine learning engine may be configured to read the training data set from the performance database and predict the performance of future jobs based on the training data set. The machine learning engine may use an artificial intelligence or learning algorithm such as a K-Nearest Neighbor (KNN) algorithm. The system may also have a user interface configured to prompt a user to enter job metadata for jobs being submitted for processing. The machine learning engine may be configured to use the job metadata to predict the performance of the user's submitted jobs. The system may also be configured to calculate confidence levels for performance predictions (e.g., based on how close the closest matching application in the performance database is) and may include a ranking module configured to generate a generic performance ranking (e.g., based on CPU performance) in response to the predicted performance of the first future job being below a predetermined confidence level.

The system may also have a performance measurer (e.g., performance module) configured to executes tests on computing systems, and a performance data collector configured to capture resulting performance data from the tests and store the results in a performance database. The machine learning engine may be configured to use the test performance data to predict the performance of jobs.

The machine learning engine may also be configured to detect whether there is insufficient data present in the performance database to a achieve a predetermined minimum confidence level in performance prediction, and in response to insufficient data being present, cause the training program to execute additional tests on additional workload and cloud computing system combinations to achieve the predetermined minimum confidence level.

The machine learning engine may also be configured to determine an eigen feature for combinations of a particular cloud system and configuration for a particular job. It may also be further configured to identify monotonic groups of combinations of cloud computing systems and configurations that have similar performance characteristics for a particular future job.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
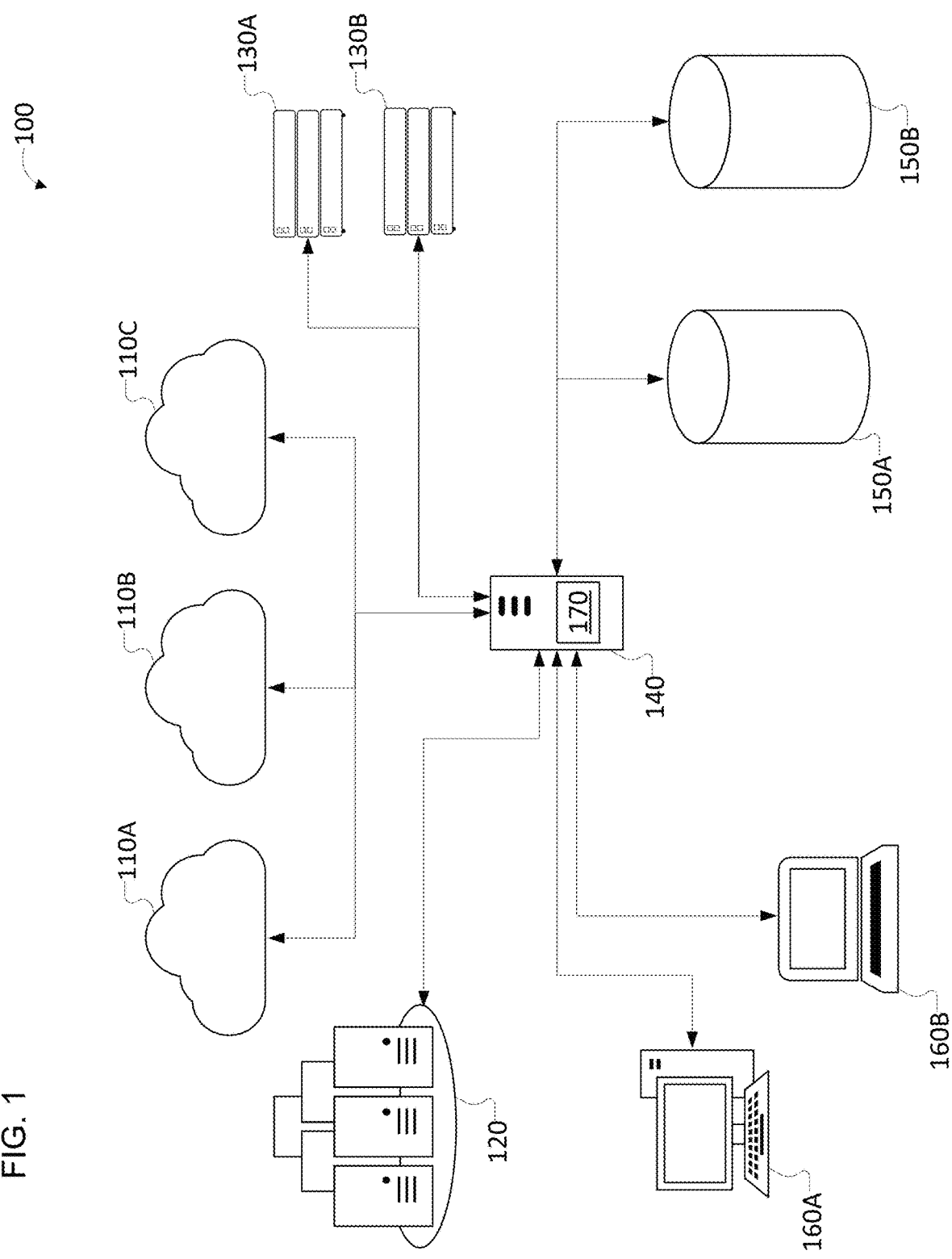
FIG. 1 is an illustration of one example of a system for performance benchmarking in a distributed computing system including bare metal and cloud computing systems.

Turning now to FIG. 1, an example of a distributed computing system 100 is shown. In this example, the distributed computing system 100 is managed by a management server 140, which may for example provide access to the distributed computing system 100 by providing a platform as a service (PAAS), infrastructure as a service (IAAS), or software as a service (SAAS) to users. Users may access these PAAS/IAAS/SAAS services from their network-connected PCs or workstations (160A) and user devices (160B) such as laptop or mobile devices via a web interface.

Management server 140 is connected to a number of different computing devices via local or wide area network connections. This may include, for example, cloud computing providers 110A, 110B, and 110C. These cloud computing providers may provide access to large numbers of computing devices (often virtualized) with different configurations. For example, systems with one, two, four, eight, etc., virtual CPUs may be offered in standard configurations with predetermined amounts of accompanying memory and storage. In addition to cloud computing providers 110A, 110B, and 110C, management server 140 may also be configured to communicate with bare metal computing devices 130A and 130B (e.g., non-virtualized servers), as well as a data center 120 including for example one or more high performance computing (HPC) systems (e.g., each having multiple nodes organized into clusters, with each node having multiple processors and memory), and storage systems 150A and 150B. Bare metal computing devices 130A and 130B may for example include workstations or servers optimized for machine learning computations and may be configured with multiple CPUs and GPUs and large amounts of memory. Storage systems 150A and 150B may include storage that is local to management server 140 as well as remotely located storage accessible through a network such as the internet. Storage systems 150A and 150B may comprise storage servers and network-attached storage systems with non-volatile memory (e.g., flash storage), hard disks, and tape storage.

Management server 140 is configured to run a distributed computing management application 170 that receives jobs (e.g., applications and data) and manages the allocation of resources from distributed computing system 100 to run them. In some embodiments, management server 140 may be a high-performance computing (HPC) system with many computing nodes, and management application 170 may execute on one or more of these nodes (e.g., master nodes) in the cluster.

Management application 170 is preferably implemented in software (e.g., instructions stored on a non-volatile storage medium such as a hard disk, flash memory, or optical storage medium), but hardware implementations are also possible. Software implementations of management application 170 may be written in one or more programming languages or combinations thereof, including low-level or high-level languages, with examples including Java, Ruby, JavaScript, Python, C, C++, C#, or Rust. The program code may execute entirely on the management server 140, partly on management server 140 and partly on other computing devices in distributed computing system 100, or in data center 120 or cloud systems 110A-C.

The management application 170 provides an interface to users (e.g., via a web application, portal, API server or CLI command line interface) that permits users and administrators to submit jobs via their workstations 160A, user devices 160B such as laptops and mobile devices, designate the data sources to be used by the jobs, configure containers to run the jobs, and set any job requirements (e.g., parameters such as how many processors to use, how much memory to use, cost limits, job priorities, etc.). This may also include policy limitations set by the administrator for the distributed computing system 100. Management application 170 may also implement a portal or marketplace for accessing computing resources where users may (i) submit an application to be run on one or more of the computing resources in the distributed computing system 100, (ii) compare performance of the different computing resource options for their application, and (iii) select, pay for, and run the application on a selected subset of the computing resources.

Management server 140 may be a traditional PC or server, a specialized appliance, or one or more nodes within a cluster. Management server 140 may be configured with one or more processors, volatile memory, and non-volatile memory such as flash storage or internal or external hard disk (e.g., network attached storage accessible to management server 140).

Management application 170 may also be configured to receive computing jobs from workstations 160A and user devices 160B, determine which of the distributed computing system 100 computing resources are available to complete those jobs, provide an interface for users to select which available resources to use, and then bind and dispatch the job to those allocated resources. In one embodiment, the jobs may be applications operating within containers (e.g. Kubernetes with Docker containers) or virtual machine (VM) instances.

Figure 2:
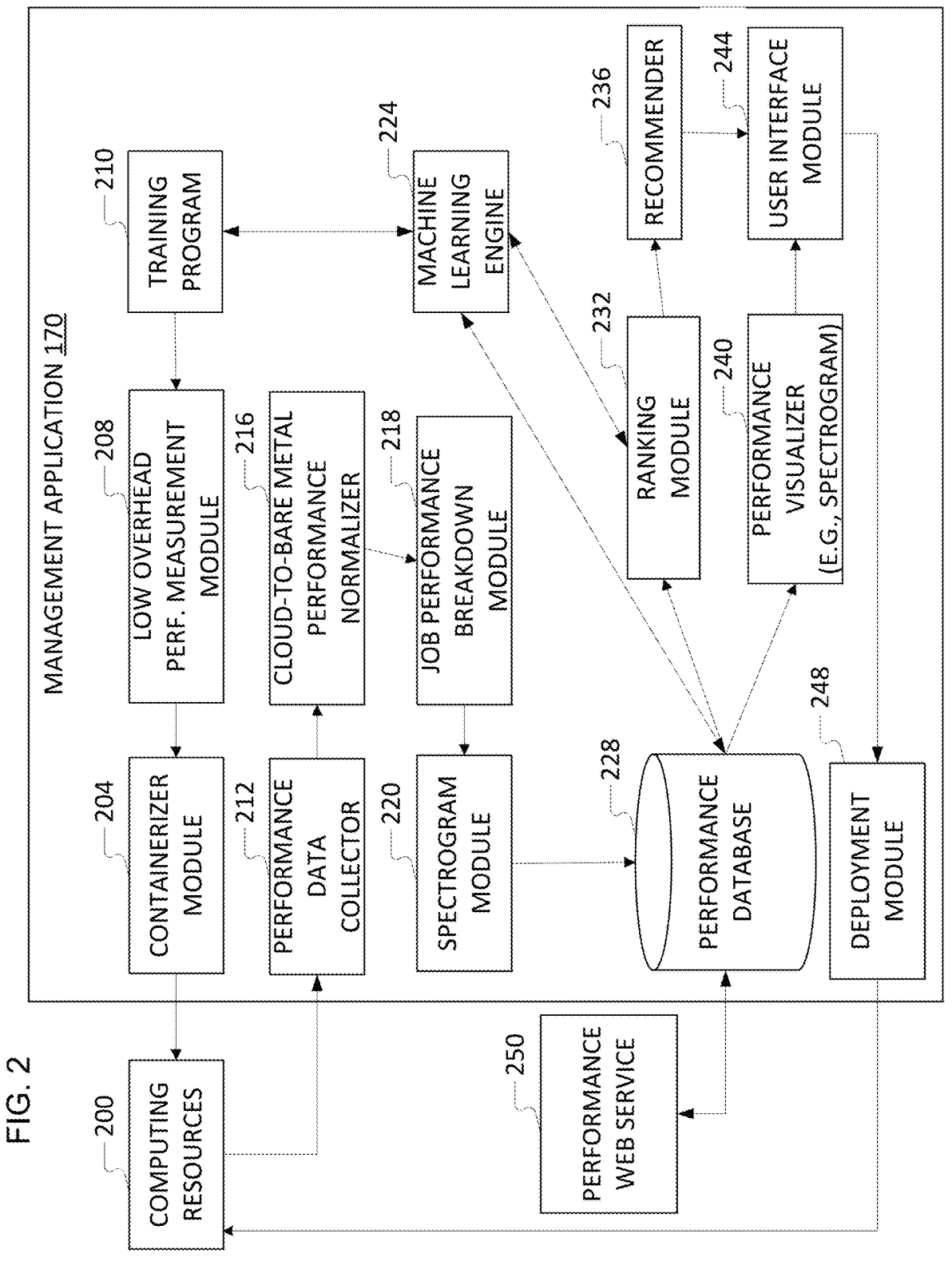
FIG. 2 is an illustration of one example of a system for performance benchmarking.

Turning now to FIG. 2, an illustration of one example of a system for creating application instances in a computing system is shown. In this embodiment, a set of computing resources 200 are managed by management application 170. Computing resources 200 may include multiple different cloud computing systems (e.g., cloud computing systems 110A-110C from FIG. 1) and multiple different bare metal computing systems (e.g., bare metal computing systems 130A-B from FIG. 1). Management application 170 may include a machine learning engine 224 and training program 210. Training program 210 may be configured to create a training data set by running one or more test applications (e.g. benchmarks, user applications) on different configurations of different cloud and bare metal computing systems. As one example, the following sample test applications may be run:

Benchmark 1: SpecCPU

Benchmark 2: IOR (Interleaved or Random) benchmark

Benchmark 3: MobileNet, ResNet, AlexNet, ImageNet, or DAWN

Benchmark 4: OSU (Ohio State University) microbenchmarks.

7

Many other tests may be also used (i.e., in addition to in place of the ones above), for example this set of five variations that test CPU and IO (grep is a Linux command line tool to search for regular expressions):

grep root.

grep-r root.

grep-r regular-expression 4-level-deep-directory grep-r root very-deep-directory grep-r complex-exp very-deep-directory The different test applications (also referred to as benchmarks or jobs herein) may be selected to test different aspects of computing system performance, including for example CPU performance, GPU performance, CPU-memory bandwidth, GPU-memory bandwidth, IO bandwidth, latency, etc., and they may be run multiple times on different configurations on each cloud system to collect a broad range of performance data for characterizing performance.

The number of test applications may be increased by using different permutations of different application options such as different compilers (e.g., Intel C Compiler versus GCC), different compiler flags, different libraries (e.g., vector-optimized versus non-vector optimized, boost.thread versus Intel TBB (thread building blocks)), etc. Different implementations of the test applications may also be separately tested. For example, in an application that performs a significant amount of searching, different search algorithms can be swapped into the application (e.g., binary search versus Fibonacci search) to determine their impact on performance. In additional, different system/container options (e.g., operating system, container type) may further increase the number of test passes and the amount of data collected.

The selected set of test applications (including all different desired permutations outlined above) are each run on multiple different computing systems with multiple different configurations to generate a matrix of performance data. For an example cloud system that allows configurations with two different CPU types, two different GPU types, and two different IO types (e.g., faster and slower), the following sixteen test passes may be performed:

Run 1—(faster CPU, fast IO), e.g., high frequency Cascade Lake w/large cache (Intel processor launched 2019), Lustre (a high-performance parallel file system)

Run 2—(faster CPU, slow IO), e.g., Cascade Lake, NFS (network file system)

Run 3—(slower CPU, fast IO), e.g., Sandy Bridge (older Intel processor launched 2011), Lustre Run 4—(slower CPU, slow IO), e.g., Sandy Bridge, NFS Run 5—1 GPU (faster GPU, fast network), e.g., A100 (a faster GPU type), Infiniband (a highspeed IO interface)

Run 6—1 GPU (faster GPU, slow network), e.g., A100, 1 Gb Ethernet (a slower IO interface)

Run 7—1 GPU (slower GPU, fast network), e.g., K80 (a slower GPU type), Infiniband Run 8—1 GPU (slower GPU, slow network), e.g., K80, 1 Gb Ethernet Run 9—4 GPUs (faster GPUs, fast network), e.g., A100, Infiniband Run 10—4 GPUs (faster GPUs, slow network), e.g., A100, 1 Gb Ethernet Run 11—4 GPUs (slower GPUs, fast network), e.g., K80, Infiniband Run 12—4 GPUs (slower GPUs, slow network), e.g., K80, 1 Gb Ethernet Run 13—8 GPUs (faster GPUs, fast network), e.g., A100, Infiniband

8

Run 14—8 GPUs (faster GPUs, slow network), e.g., A100, 1 Gb Ethernet

Run 15—8 GPUs (slower GPUs, fast network), e.g., K80, Infiniband

Run 16—8 GPUs (slower GPUs slow network), e.g., K80, 1 Gb Ethernet

Additional sets of test passes may be performed on the other available cloud systems, with multiple test passes being performed for different permutations of configurations available on those cloud systems (may be similar or different to the ones above, depending on the hardware options available). This may result in a large number of test passes (e.g., number of applications x number of application permutations x number of computing systems x number of computing system configuration permutations).

Additional runs may be performed testing other configuration options such as IO options, memory options, etc. Each configuration (which may also be referred to as a queue) may have different performance features (e.g. maximum frequency, memory/cache sizes, maximum number of cores, floating point operations per second) that result in a different theoretical peak performance level characteristics for an ideal workload. The test runs provide performance data on real world performance, which may be more predictive than just theoretical performance.

Examples of the performance characteristics that can be determined from the data collected may be:

a) Identification of hot blocks, code bottlenecks, and resource intensive portions of the application, b) Instructions per second (IPS) or run-time, c) Performance logs or tool output, and d) Scoring relative to predefined performance vectors (e.g., CPU utilization, memory utilization, IO utilization, network utilization, floating point utilization, integer utilization).

Each type of performance characteristics data collected may for example be formatted in an array: (WIC1, perf feature), (W2C2, perf feature), (W3C3, perf feature), . . . , where W is a workload, C is a computing resource and configuration combination (e.g., Cloud A with 4 faster GPUs and a slow network), and <perf feature> can be a single performance characteristic vector (or resource utilization function, e.g. IPS) or a composite of vectors across multiple dimensions, or even a spectrometer created from the collected data. In one embodiment, performance characteristics data may be measured as the Euclidean distance between all performance counters on per second basis, e.g., instructions per second (IPS), mpi_barriers per sec (measures message passing interface performance), cache misses per second, 4B blocks R/W per second, etc.

Training program 210 may be configured to pass the test and configuration combinations to be run to low overhead performance measurement module 208. Low overhead performance measurement module 208 may be configured to select which performance counters should be enabled for each test, and then utilize containerization module 204 to create containers for the tests that are then deployed for execution on the computing resources 200 in the distributed computing system by deployment module 248. For example, computing resources 200 may include local bare metal computing systems, remote data centers, and multiple different cloud computing service providers.

The data collected by the performance counters during the test runs is collected by performance data collector module 212. In some cases, it may be helpful to normalize the collected performance data using cloud-to-bare metal performance normalizer 216. For example, when a test is run on a virtualized cloud computing system that does not permit access to a CPU instructions counter for performance counting, cloud-to-bare metal performance normalizer 216 may be configured to calculate a normalized synthetic instructions counter based on other data that is captured for the test running in the virtualized cloud environment.

The collected (and optionally normalized) performance data may also be broken down into application phases for better characterization by job performance breakdown module 218, and further refined by spectrogram module 220 into an application performance spectrogram (e.g., application performance fingerprint) by quantizing and normalizing the performance data for each application phase. For example, the job performance breakdown for an application may be calculated based on the amount of time spent being bound by a particular performance characteristic, e.g., breakdown=0.1*CPU+0.9*IO, if the application spent 10% of its execution time being CPU bound, and 90% of its execution time being IO bound). Job performance breakdown module 218 may also create job performance summaries that may include for example, logs, performance assistant data, performance characteristics, identify segments, labels for eigen features, etc.

Once processed, the collected performance data may be stored into a performance database 228. The database may be internal to management application 170, external to management application 170 yet still residing on management server 140 (from FIG. 1.), or it may be hosted remotely (e.g., on a cloud computing service).

Machine learning engine 224 may be configured to read the performance data stored in performance database 228 as directed by training program 210 to train the engine used by machine learning engine 224. This process may be repeated as new performance data is stored into performance database 228. For example, when a new computing resource is added (e.g., a new cloud computing service provider is added) training program 210 may initiate the performance characterization process of that new computing resource resulting in updated performance data being stored in performance database 228. Similarly, if a new configuration becomes available for an existing cloud computing service (e.g., a new processor type or GPU type is added), additional training may be initiated to characterize the new configuration.

The performance data stored in performance database 228 is used by ranking module 232 to provide a ranked list of the computing resources that are available for a particular job. For example, ranking module 232 may sort the available computing resources based on memory bandwidth/latency, IO bandwidth/latency, network bandwidth/latency, CPU integer performance, CPU floating point performance, GPU performance. The ranking may for example be a linear function based on one performance variable, or it may be based on a job performance breakdown. For example, if the job performance breakdown of the application is determined from a test run to be 10% CPU bound and 90% IO bound, then the available computing system-configuration options may be ranked based on a calculated score that combines their CPU and IO performance (either for a the most similar application for which data is available, or if similar data is not available then as an average across all data points for the computing system-configuration combination) as weighted similarly to the test run of the application (e.g. 0.1*CPU+ 0.9*IO).

In some embodiments, the performance of a user application may be monitored in real-time as it is executing, and the ranking module 232 may present a list of what other workloads are similar (e.g., closest) to the user's application based on the performance data being collected (e.g., either for the same computing system-configuration combination, just the same computing system, or across all computing system-configuration combinations). Ranking module 232 may also provide a ranked listing of the impact of different performance characteristics on the user's application (e.g., a list of which improvements would have the biggest impact on the user's application performance). For example, performance improvements for the user's application due to improvements in different performance characteristics (e.g. IO bandwidth, network bandwidth, CPU instructions per second) may be estimated and presented in a ranked list based on their impact, so an application that spends 80% of its time with a fully saturated IO channel waiting for data from storage and 20% of its time CPU-bound would see a ranked list with improving IO bandwidth first and improving CPU performance second. The ranking module 232 may also identify which workload features have a larger impact on performance on a given computing system.

The ranking engine may also be configured to calculate variations from run-to-run and present a ranked list to the user of variance across different computing systems. For example, Cloud A may have more variability in the types of workloads sharing their cloud infrastructure and may therefore result in a higher variability of run-to-run performance, whereas Cloud B may not fill their cloud infrastructure as much, so Cloud B may have less variability in run-to-run performance. This may be useful information for a user that values predictable runtimes.

When a new computing system-configuration combination is added, ranking module 232 may be configured (once initial testing has been performed) to present ranked performance lists showing users where the new computing system-configuration combination fits relative to the performance of existing known computing system-configuration combinations. This may for example be based on KNN algorithmic learning on the performance data performed by machine learning engine 224. In this way, performance of a known workload can be predicted for a new computing system-configuration combination on which the known workload has not been run. Similarly, the performance of a new workload can be predicted for a set of known computing system-configuration combinations (e.g., by finding similar existing workloads in the performance database based on a test run of the new workload or application metadata).

The collected performance data may be aggregate (e.g., combining data from many or all runs) to improve the accuracy of predictions as more real data points may yield more accurate predictions)—to make prediction more refined. A variety of heuristics may be used to fill in missing data (e.g., empty cells in a performance matrix in the performance database) For example, the neighboring data may be averaged to fill in the missing cells. Regularization methods may also be used to reduce the number of dimensions and the sparsity of the matrix. When data is sparse, performance predications may be generated that are relative (to previous applications and runs) rather than absolute, as relative predictions require less data to be accurate than absolute performance predictions.

In some embodiments, supervised and unsupervised algorithms may be used, as may be regression algorithms (e.g., to generate absolute performance predictions) and classification algorithms (e.g., to generate relative performance predictions). The prediction model may also be cross validated to test the model and improve the accuracy of the model.

The machine learning engine 224 may also be configured to determine the eigen feature of a workload for a given computing system-configuration combination based on performance data collected during a test run. The eigen feature for the grep examples above may for example be the size of a search, directory depth, complexity of regular expression, libraries, etc. The machine learning engine 224 may also be configured to determine a confidence level of the predictions based on how much data and close the prior applications and computing system-configuration combinations are to the application or configuration being predicted. If confidence is low, or if not enough data exists, the machine learning engine 224 may be configured to provide what combinations are missing data to training program 210, which can then create additional test runs to fill in the missing gaps or to improve the confidence level for the predictions.

For example, data and metadata stored in performance database 228 (e.g., libraries used, system requirements, optimizations such as compiler flags, vector width, multi-threading, build and configuration parameters, dataset hashtags, validation tests & benchmarks, run scripts, run configuration, topology, rank/node, container/pod placement, peak performance characteristics and benchmarks to achieve them, hardware attributes, average cores per node, validation test & benchmark results) may be used by machine learning engine 224 to create a test matrix for training program 210 indicating which computing system-configuration combinations should be tested for which features, and training program 210 may be configured to select the appropriate test application benchmarks to run to fill in the missing data.

In some embodiments, the machine learning engine 224 may also be configured to perform a sensitivity analysis and find derivatives and monotonic groups within sets of application or sets of computing system-configuration combinations. This may help users determine how much they can vary a configuration such as queue memory size or cache size and still achieve similar application performance or a similar application performance signature/fingerprint.

The ranked list may be used by a recommender module 236 to make recommendations to the user as to which computing system resources and computing system configurations will have the best performance, performance per cost, or lowest cost to solution for the user's particular application and data. The performance data stored in performance database 228 may also be used by a performance visualizer 240 to present a visualization to a user through user interface module 244. One example of such a visualization is an application spectrogram that visualizes application performance fingerprints.

User interface module 244 may be configured to present the user with controls enabling the user to select a particular combination of computing resources and configurations to execute their application. User interface module 244 may also be configured to provide the user with pricing information and one or more payment options. Once the user has selected a computing resource and configuration combination and has specified payment, the user's application may be deployed to computing resources 200 via deployment module 248. Deployment module 248 is configured to reserve or allocate specific subsets of computing resources 200 to run the tests containers and user application containers. This may include configuring the network addresses of the containers from containerization module 204 to ensure that performance data for the tests and user applications is properly routed back to performance data collector 212.

In some embodiments, upon receiving a new workload, the management application 170 may be configured to predict the performance of the new workload across the different available computing system and configuration combinations and predict whether one option (e.g., Cloud A instance with 1 type U CPU and 4 type X GPUs) is likely to perform better for the application than another option (e.g., Cloud B instance with 1 type V CPU and 4 type Y GPUs) without having to run new workload on both systems. Instead, the new workload's performance may be tested on a single configuration, then the machine learning engine 224 may find one or more similar existing test applications that have been run on the combinations in question (or on combinations similar to the combinations in question) and make predictions based on that association.

In some embodiments, management application 170 may be configured to share performance data with a performance data sharing web service 250. Raw performance data, or processed and normalized performance data may be shared. In some embodiments, the data may also be anonymized to remove any potentially identifying information. The management application 170 may also query the performance data sharing web service 250 for information to fill in gaps in performance database 228 or for applications that have not been run before. In some embodiments, performance database 228 may even be within performance data sharing web service 250.

Figure 3:
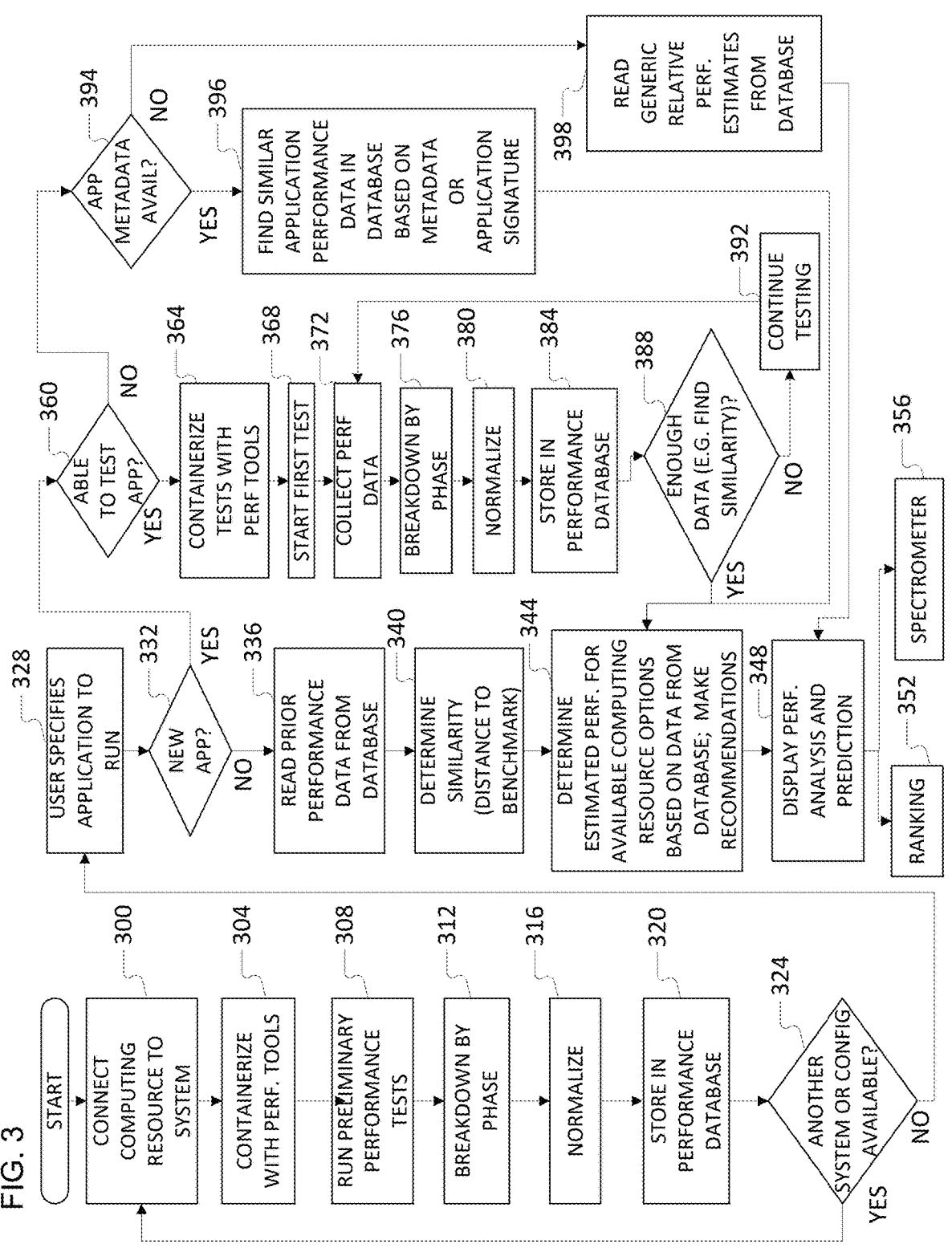
FIG. 3 is a flowchart of one example of a method for performance benchmarking.

Turning now to FIG. 3, a flowchart illustrating one example of a method for performance benchmarking in mixed cloud and bare metal environments is shown. In this example, steps 300-324 represent one example of an initialization phase that characterizes the different computing resources and configurations available. In response to one or more new computing resources (e.g., a new cloud computing provider) or computing resource configurations (e.g., a new type of CPU or GPU option within an existing cloud computing provider) becoming available (step 300), one or more tests configured to measure the performance of the computing resource are containerized together with performance tools (step 304). For example, if the computing resource includes GPUs, then tests that measure GPU performance and GPU-memory bandwidth may be included, and if the computing resource does not include GPUs, then those tests may not be included in the container. Additional examples of methods for measuring performance are described in U.S. patent application Ser. No. 17/400,584, filed Aug. 12, 2021, titled "LOW OVERHEAD PERFORMANCE DATA COLLECTION", and U.S. patent application Ser. No. 17/393,730, filed Aug. 4, 2021, titled "CLOUD TO BARE METAL CORRELATION FOR PERFORMANCE ESTIMATION AND PREDICTION" the entire disclosures of which, except for any definitions, disclaimers, and inconsistencies, is incorporated herein by reference.

Preliminary performance tests are then run (step 308), and the performance data is collected, broken down by application phase (step 312), normalized (step 316), and stored in a performance database (step 320). Additional examples of methods for collecting, normalizing, and storing performance data are described in the following United States Provisional Patent Applications, the entire disclosure of which, except for any definitions, disclaimers, and inconsistencies, is incorporated herein by reference: Application Ser. No. 63/054,458, filed Jul. 21, 2020, titled "SYSTEM AND METHOD FOR RECOMMENDING COMPUTING RESOURCES"; Application Ser. No. 63/061,134, filed Aug. 4, 2020, titled "CLOUD TO BARE METAL CORRELA- TION FOR PERFORMANCE ESTIMATION AND PRE-DICTION"; Application Ser. No. 63/064,616, filed Aug. 12, 2020, titled "LOW OVERHEAD PERFORMANCE DATA COLLECTION"; Application Ser. No. 63/065,003, filed Aug. 13, 2020, titled "APPLICATION PERFORMANCE DATA PROCESSING"; Application Ser. No. 63/067,047, filed Aug. 18, 2020, titled "RANKING COMPUTING RESOURCES"; Application Ser. No. 63/066,429, filed Aug. 17, 2020, titled "JOB PERFORMANCE BREAKDOWN", and Application Ser. No. 62/990,552, filed Mar. 17, 2020, titled "METHOD FOR APPLICATION PERFORMANCE CHARACTERIZATION AND PROFILING AS A SERVICE".

As additional computing resources or configurations become available, this process is repeated (step 324).

Once the system has been initialized and preliminary performance data has been collected on the computing resources and configurations that are available, users may specify and upload applications to be run (step 328). The system may be configured to check the performance database to see whether the application (or an application similar to the application, e.g., based on application name, hash, or fingerprint) has already been run on the system (step 332). If the application is not new or unknown, the relevant prior performance data may be read from the performance database (step 336), and a determination may be made of how similar the computing system and configuration combination(s) for the relevant performance information are to the combinations of interest (step 340). For example, if the application was already run on the same computing system with the same configuration, then the performance data would be highly similar. If the computing system was of a different type (e.g., without GPU) from the systems and configuration combinations being evaluated (e.g. they have GPUs), then the similarity would be lower. If the application itself had not been run, but a benchmark similar to that application had been run (e.g., the application uses the TensorFlow machine learning library and a TensorFlow application or benchmark had been previously run), then the similarity would be lower than if the application itself had been run.

Estimated performance for the application can then be determined (step 344) for the available computing system and configuration combinations. In some embodiments, a deterministic algorithm may be used to find the most similar existing application in the performance database to be used to estimate performance. In other embodiments the determination may be performed by a machine learning or artificial intelligence algorithm. For example, a k-nearest neighbors (KNN) algorithm may be used. The algorithm may be trained on the data already stored in the performance database and once trained it may select the closest matching application(s)/benchmark(s) to estimate the new application's performance on the combinations of computing systems (e.g., Cloud A and Cloud B) and configurations (e.g., 2 CPUs, 4 CPUs) of interest.

The estimated performance data may be analyzed and displayed (step 348) to the user, e.g., as a ranked list (step 352) or in a more visual format such as an application performance spectrometer (step 356). The ranked list may be based for example on the one or two most important performance limiting factors according to the data in the performance database (e.g., ranking by CPU performance, then memory bandwidth, or ranking by GPU performance then IO bandwidth).

If the application is new (e.g., no existing performance data for it is present in the performance database), a determination is made as to whether the application can be tested (step 360). While testing may be preferred, there may be instances where the application cannot be tested (e.g., the customer prefers not to test the application). If testing of the application is possible, the application may be containerized together with one or more performance monitoring tools or performance monitoring settings (step 364). One or more test passes on different computing system and configuration combinations may be started (step 368), and the resulting performance data may be collected (step 372). The collected performance data may be broken down by application phase (step 376), normalized (step 380), and then stored in the performance database (step 384). If enough data has been collected to find a similarity with existing application performance data in the performance database (step 388), e.g., one of the benchmarks or applications used in the initialization process or a prior run application is within a predetermined margin of similarity, then the similarity is used to determine estimated performance data for the combinations of computing systems and configurations of interest (step 344). If there is insufficient data, additional tests may be run (step 392), e.g., continuing to run the test for longer periods of time, or to also launch the tests on one or more different computing system and configuration combinations. This can be performed in parallel while the initial tests are continuing to reduce the wait time.

In some embodiments, If the application is new, and the application testing of the application is not feasible or desirable (step 360), application metadata may be used if it is available (step 394) to find similar applications in the performance database (step 396). For example, application metadata such as the type of application (e.g., image recognition using the Tensorflow library) may be used to pick the most similar application in the performance database which may then be used to predict the applications performance on the combinations of computer systems and configurations that are of interest. In some embodiments, the user may be prompted to enter application metadata if the system is unable to automatically determine it for the user's application. If the application is new, and testing is not available (step 360), and application metadata is not available (step 394), generic relative performance information estimates from the performance database may be used to present a ranked list to the user (step 398). While the steps are shown in a particular order in the figure, some steps may be performed in parallel or in a different order, and in some embodiments some steps may be omitted.

Figure 4:
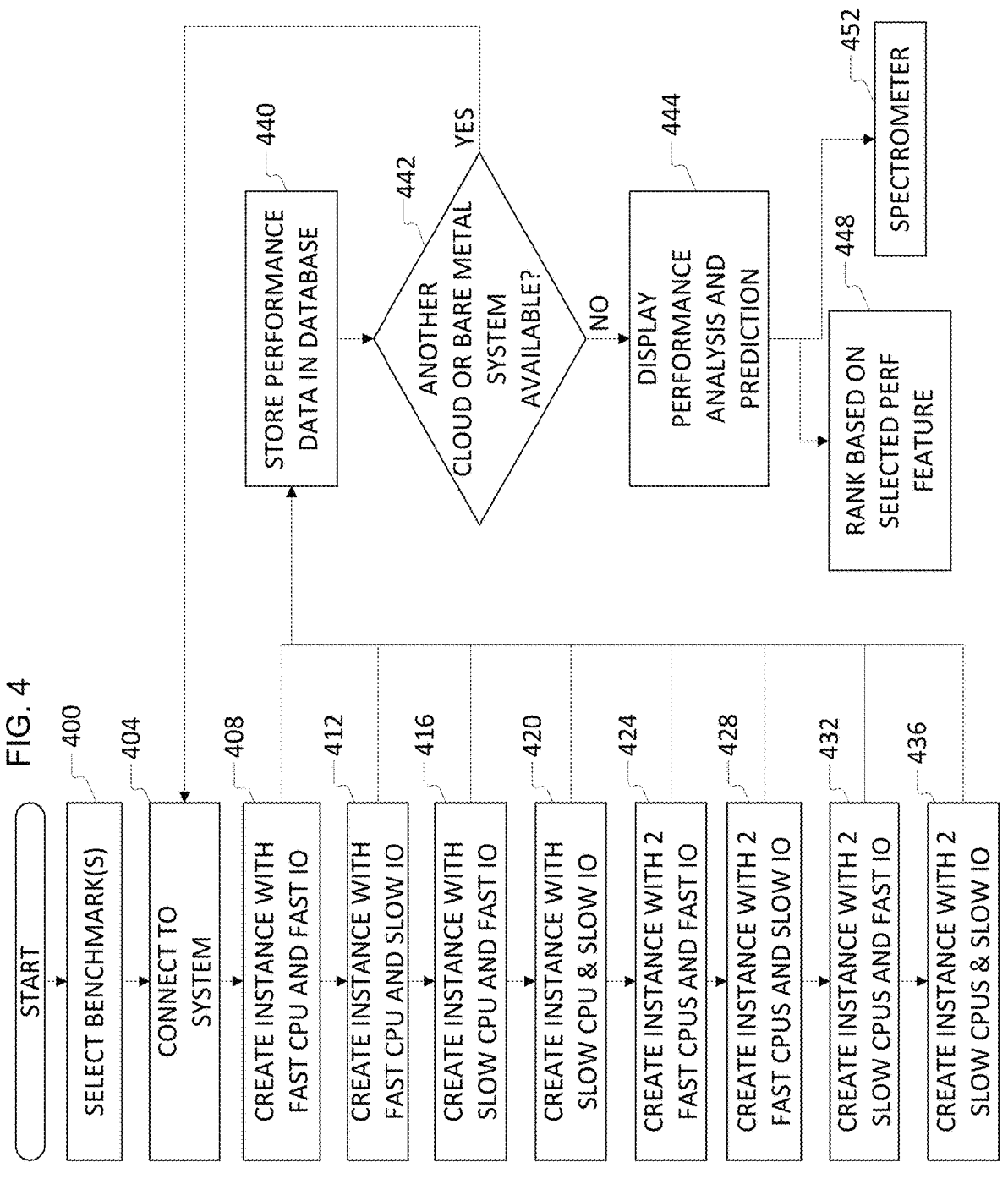
FIG. 4 is a flowchart of another example of a method for performance benchmarking.

Turning now to FIG. 4, a flowchart of another example of a method for performance benchmarking is shown. In this embodiment, one or more applications or benchmarks are selected (step 400), and a connection is made to a computing system and corresponding set of configuration options are determined (step 404). For example, a cloud computing provider may have two different types of CPUs available (a faster CPU and a slower CPU) and two types of IO available (a faster IO and a slower IO). Separate instances are then created for each possible combination. In this example, instances with one fast CPU and fast IO (step 408), one fast CPU and slow IO (step 412), one slow CPU and fast IO (step 416), one slow CPU and slow IO (step 420), two fast CPUs and fast IO (step 424), two fast CPUs and slow IO (step 428), two slow CPUs and fast IO (step 432), two slow CPUs and slow IO (step 436). While shown in series, these steps may be performed in parallel, and data may be collected in parallel as each of the instances may operate asynchronously. As data from the instances is collected, it may be processed and stored in the performance database (step 440).

This process may be repeated has additional cloud or bare-metal computing systems become available (step 442).

Once data is present in the performance database, it may be analyzed and used to display predicted performance (step 444) and recommendations such as ranked system/configuration combinations for the user (step 448), e.g., based on overall performance. The ranked list may be filterable by the user by selectable factors such as CPU-memory bandwidth, GPU-memory bandwidth, IO bandwidth, etc. The performance information may also be displayed in other more visual formats such as a performance spectrometer (step 452).

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." and "for example" in the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for predicting performance of a job, the method comprising:

creating a training data set by running different test applications on different cloud computing systems using different configurations, wherein the different test applications are selected to test specific performance characteristics of the cloud computing systems and configurations, and the training data set includes performance feature vectors associated with individual test applications and configurations;

training a machine learning engine using the training data set, the training incorporating performance feature data extracted from the different test applications and associating the performance feature data with specific configurations;

predicting a performance level for a first future job using the machine learning engine, wherein the prediction comprises comparing one or more performance characteristics of the first future job against corresponding performance characteristics of previously executed test applications stored in a performance database;

generating a ranked list of computing system configurations based on the predicted performance level for the first future job, wherein the ranked list is ordered according to one or more performance-limiting factors identified for the first future job, including at least one of CPU utilization, memory bandwidth, GPU capability, or I/O throughput;

generating, using the ranked list, one or more recommendations of computing system configurations for the first future job;

configuring and deploying the first future job on a computing system in accordance with a computing system configuration selected from the one or more recommendations;

calculating a level of confidence for the predicted performance level;

detecting whether there is insufficient data present in the training data set to achieve a predetermined level of confidence in the predicting; and in response to insufficient data being present, creating a list of additional test application and cloud computing system combinations for testing that will enable achieving the predetermined level of confidence.

2. The method of claim 1, further comprising:

using heuristics to fill in missing data; and performing cross-validation of the machine learning engine.

3. The method of claim 1, further comprising:

collecting job metadata; and using the job metadata in the predicting.

4. The method of claim 1, further comprising displaying a generic performance ranking based on CPU in response to the predicted performance level for the first future job being below a predetermined confidence level.

5. The method of claim 3, further comprising:

running a test of the first future job on a first computing system; and capturing a set of performance data for the test, wherein the predicting comprises using the set of performance data in lieu of the job metadata.

6. The method of claim 1, further comprising predicting an eigen feature for the first future job for each of the different cloud computing systems.

7. The method of claim 1, further comprising calculating an eigen feature for each test application in the training data for each of the different cloud computing systems.

8. The method of claim 1, further comprising predicting which of the different cloud computing systems is likely to have a largest variance in absolute performance across multiple runs of the first future job.

9. A non-transitory computer-readable storage medium comprising instructions which, when executed by a computer, cause the computer to carry out the steps of the method of claim 1.

10. A system for managing computing jobs, the system comprising:

a performance database;

at least one processor;

a training program configured to create a training data set by running different test applications on different cloud computing systems using different configurations, wherein the training program is configured to store the training data set in the performance database, and the different test applications are selected to test specific performance characteristics of the cloud computing systems and configurations, and the training data set includes performance feature vectors associated with individual test applications and configurations;

a machine learning engine configured to read the training data set from the performance database and predict a performance level for a first future job based on the training data set, wherein the prediction comprises comparing one or more performance characteristics of the first future job against corresponding performance characteristics of previously executed test applications stored in the performance database;

a ranking module configured to generate a performance ranking based on CPU in response to a predicted performance level of the first future job being below a predetermined minimum confidence level;

wherein the machine learning engine is configured to generate a ranked list of computing system configurations based on the predicted performance level for the first future job and generate, using the ranked list, one or more recommendations of computing system configurations for the first future job;

wherein the machine learning engine is further configured to detect whether there is sufficient data present in the performance database to achieve the predetermined minimum confidence level in performance prediction, and in response to insufficient data being present, cause the training program to execute additional tests on additional cloud computing system combinations to achieve the predetermined minimum confidence level;

wherein the ranked list is ordered according to one or more performance-limiting factors identified for the first future job, including at least one of CPU utilization, memory bandwidth, GPU capability, or I/O throughput; and wherein the at least one processor is configured to configure and deploy the first future job on a computing system in accordance with a computing system configuration selected from the one or more recommendations.

11. The system of claim 10, wherein the machine learning engine uses a K-Nearest Neighbor algorithm.

12. The system of claim 10, further comprising:

a user interface configured to prompt a user to enter job metadata for the first future job, wherein the machine learning engine is configured to use the job metadata in predicting the performance level of the first future job.

13. The system of claim 10, further comprising:

a performance measurer configured to execute a test of a second future job on a first cloud computing system, and a performance data collector configured to capture a set of test performance data for the test and store the set of test performance data in the performance database, wherein the machine learning engine is configured to use the test performance data to predict the performance level of the second future job.

14. The system of claim 10, wherein the machine learning engine is further configured to determine an eigen feature for a combination of a particular cloud system and the first future job.

15. The system of claim 10, wherein the machine learning engine is further configured to perform a sensitivity analysis and find derivatives and monotonic groups within sets of applications or sets of computing system-configuration combinations.

16. The system of claim 10, wherein the different configurations includes one or more of a number and/or type of central processing units (CPUs) and a number and/or type of graphics processing units (GPUs).

17. The system of claim 10, wherein the different configurations includes one or more of CPU-memory bandwidth, GPU-memory bandwidth, input/output (IO) options, and latency.

18. The system of claim 10, wherein the machine learning engine uses supervised or unsupervised learning.

19. The method of claim 1 further comprising selecting different test applications to test different aspects of performance including central processing unit (CPU) performance, graphics processing unit (GPU) performance, CPU-memory bandwidth, GPU-memory bandwidth, IO bandwidth, and latency, wherein the selected different test applications are each run on the different cloud computing systems using the different configurations to generate a matrix of performance data to train the machine learning engine.

20. The method of claim 1 wherein each configuration has different performance features that result in different performance characteristics, and wherein the performance characteristics include one or more of a) identification of hot blocks, code bottlenecks, and resource intensive portions of the application, b) instructions per second (IPS) or run-time, c) performance logs or tool output, and d) scoring predefined performance vectors.

\* \* \* \* \*